United States Patent
Noda (10) Patent No.: US 8,224,168 B2
(45) Date of Patent: Jul. 17, 2012

(54) IMAGE PICKUP APPARATUS AND LENS APPARATUS HAVING MECHANICAL AND ELECTRONIC SHUTTERS WHERE BLUR CORRECTION IS ADJUSTED ACCORDING TO SHUTTER MODE

(75) Inventor: Hiroshi Noda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 317 days.

(21) Appl. No.: 12/126,186

(22) Filed: May 23, 2008

(65) Prior Publication Data

US 2008/0298791 A1    Dec. 4, 2008

(30) Foreign Application Priority Data

May 28, 2007  (JP) ................. 2007-140189

(51) Int. Cl.
*G03B 17/00* (2006.01)
*H04N 5/228* (2006.01)

(52) U.S. Cl. .......... 396/55; 396/52; 396/471; 348/208.5

(58) Field of Classification Search ............... 396/55
See application file for complete search history.

(56) References Cited

U.S. PATENT DOCUMENTS

| | | | | |
|---|---|---|---|---|
| 6,035,133 A | * | 3/2000 | Shiomi | 396/55 |
| 6,687,458 B2 | * | 2/2004 | Masuda | 396/55 |
| 6,801,250 B1 | * | 10/2004 | Miyashita | 348/220.1 |
| 7,499,635 B2 | * | 3/2009 | Tanaka et al. | 396/55 |
| 7,634,179 B2 | * | 12/2009 | Misawa | 396/55 |
| 7,653,293 B2 | * | 1/2010 | Masuda | 396/55 |
| 2005/0140793 A1 | * | 6/2005 | Kojima et al. | 348/208.99 |
| 2007/0189745 A1 | * | 8/2007 | Masuda | 396/55 |
| 2008/0044170 A1 | * | 2/2008 | Yap et al. | 396/52 |
| 2008/0211922 A1 | * | 9/2008 | Murashima et al. | 348/208.99 |
| 2009/0231450 A1 | * | 9/2009 | Tanaka et al. | 348/208.7 |
| 2009/0251550 A1 | * | 10/2009 | Nakamura et al. | 348/208.4 |

FOREIGN PATENT DOCUMENTS

JP    9-043660 A    2/1997

* cited by examiner

*Primary Examiner* — Clayton E Laballe
*Assistant Examiner* — Bret Adams
(74) *Attorney, Agent, or Firm* — Canon U.S.A., Inc. IP Division (57) ABSTRACT

An image pickup apparatus having removably attached thereto a lens apparatus including a blur correction unit includes a selection unit configured to select a first mode in which a mechanical shutter is used to start exposure or a second mode in which an electronic shutter is used to start exposure; and a controller configured to output information indicating the start of exposure to the lens apparatus. The controller changes the information indicating the start of exposure depending on whether the first mode or the second mode is selected to control the lens apparatus to perform different blur correction operations.

9 Claims, 6 Drawing Sheets

IMAGE PICKUP APPARATUS AND LENS APPARATUS HAVING MECHANICAL AND ELECTRONIC SHUTTERS WHERE BLUR CORRECTION IS ADJUSTED ACCORDING TO SHUTTER MODE

BACKGROUND OF THE INVENTION

1. Field of the Invention

The present invention relates to an image pickup apparatus equipped with an electronic shutter and a mechanical shutter, and a lens apparatus.

2. Description of the Related Art

Electronic shutters and mechanical shutters have been available as shutters used for exposure control. The electronic shutters are operable to control a timing of starting storing of electric charge in an image pickup element or a timing of reading the electric charge, and the mechanical shutters are provided with light-shielding blades (front curtain and rear curtain) configured to block a light-receiving surface of an image pickup element from light. Image pickup apparatuses including shutters of these types may also be provided with a blur correction device (blur correction unit) configured to correct for image blur caused by shaking of the image pickup apparatuses or by vibration which may occur during operation of the shutters.

An image pickup apparatus including a mechanical shutter as a shutter has the following structure. Vibration caused during operation of the shutter, or more specifically, vibration caused during operation of the light-shielding blades, is detected, and a blur correction value is calculated on the basis of the detected vibration. The blur correction value is output to a blur correction device so that image blur caused by the vibration can be corrected for (Japanese Patent Laid-Open No. 09-043660).

SUMMARY OF THE INVENTION

The present invention provides an image pickup apparatus configured to output information associated with a shutter to be selected to a blur correction unit to provide a blur-free image, and a lens apparatus.

There have not been available image pickup apparatuses including both an electronic shutter and a mechanical shutter as shutters so that one of these shutters can selectively be used for exposure control. In such image pickup apparatuses, a blur correction value to be output to a blur correction device is changed depending on which of the electronic shutter and the mechanical shutter is used as a shutter for exposure control in order to appropriately correct for image blur.

According to a first aspect of the present invention, an image pickup apparatus having removably attached thereto a lens apparatus including a blur correction unit includes a selection unit configured to select a first mode in which a mechanical shutter is used to start exposure or a second mode in which an electronic shutter is used to start exposure, and a controller configured to output information indicating the start of exposure to the lens apparatus. The controller changes the information indicating the start of exposure between first information and second information depending on whether the first mode or the second mode is selected to control the lens apparatus to perform different blur correction operations.

According to a second aspect of the present invention, an image pickup apparatus having removably attached thereto a lens apparatus including a blur correction unit includes a selection unit configured to select a first mode in which a mechanical shutter is used to start exposure or a second mode in which an electronic shutter is used to start exposure, and a controller configured to control operation of the lens apparatus. The controller outputs information indicating the start of exposure to the lens apparatus to change a blur correction operation of the lens apparatus when the first mode is selected, and does not output information indicating the start of exposure to the lens apparatus when the second mode is selected.

Further features of the present invention will become apparent from the following description of exemplary embodiments with reference to the attached drawings.

DESCRIPTION OF THE EMBODIMENTS

Exemplary embodiments of the present invention will be described hereinafter.

Figure 1:
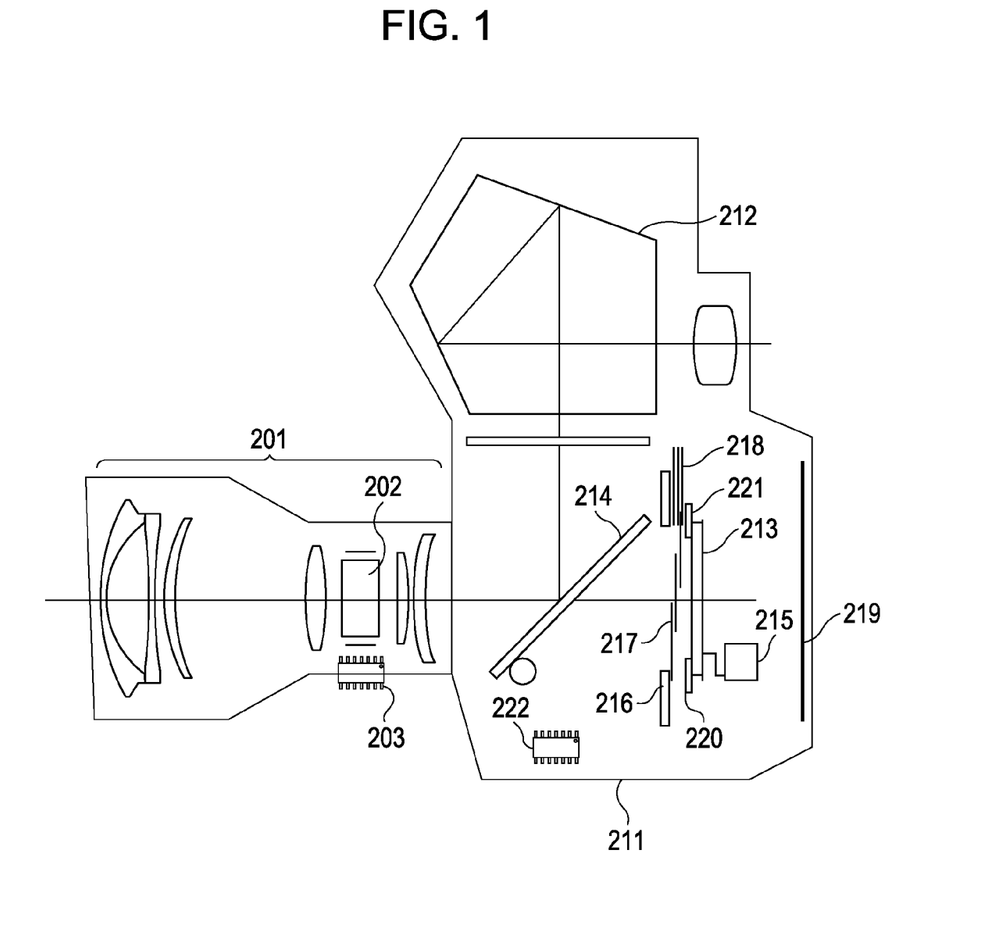
FIG. 1 is a block diagram of an image pickup apparatus according to an exemplary embodiment of the present invention.

FIG. 1 is a diagram showing a structure of an image pickup apparatus according to an exemplary embodiment of the present invention. Referring to FIG. 1, the image pickup apparatus includes an interchangeable lens 201 and a main body 211 of the image pickup apparatus. The image pickup apparatus of the exemplary embodiment further includes an electronic shutter and a mechanical shutter as selectable shutters.

The interchangeable lens 201 includes a blur correction optical system 202 configured to correct for image blur, and a blur correction control microcomputer 203 configured to control the driving of the blur correction optical system 202 on the basis of a blur detection signal. The blur correction optical system 202, the blur correction control microcomputer 203, etc., constitute a blur correction device (blur correction unit) configured to correct for image blur.

The main body 211 includes a reflex mirror 214 configured to direct a light beam coming from the interchangeable lens 201 toward a finder optical system 212 or an image pickup element 213. The main body 211 further includes a vibration detection unit 215 configured to detect vibration such as shaking of the image pickup apparatus or vibration which may occur during operation of the shutters, and a light-shielding mask 216 configured to block a light beam coming from the periphery of the imaging circle of the interchangeable lens 201, which is not required in view of the size of a photographed image. The main body 211 further includes a front curtain 217 and rear curtain 218 of the mechanical shutter, a liquid crystal display 219 operable to provide visual display such as live-view display, and position determining units 220 and 221 configured to determine a boundary position.

The main body 211 further includes a main body microcomputer 222 configured to control the overall operation of the image pickup apparatus. Various types of processing such as calculations, storing of blur correction information, and storing of records, and an electronic shutter function are implemented by the main body microcomputer 222, a built-in program preset therein, and a memory by using various devices (not shown). The main body 211 further includes an automatic selector configured to select one of the shutters, which is described below.

Figure 2A:
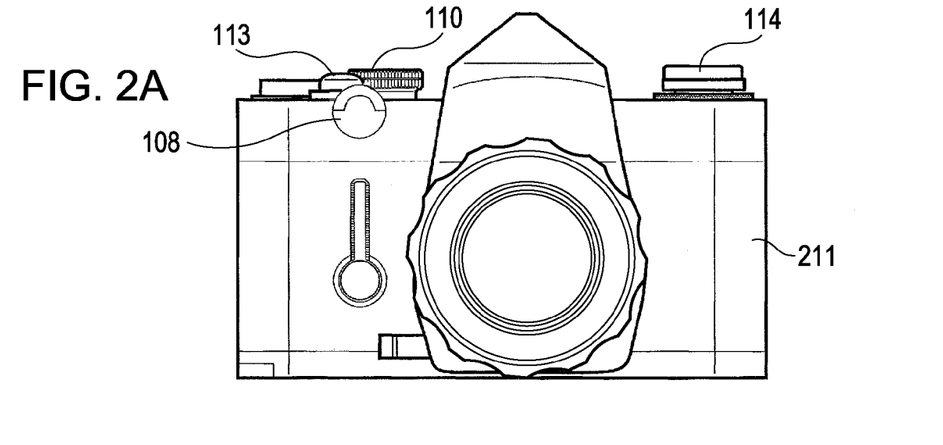
FIGS. 2A to 2C are external views of the image pickup apparatus according to the exemplary embodiment of the present invention.
Figure 2B:
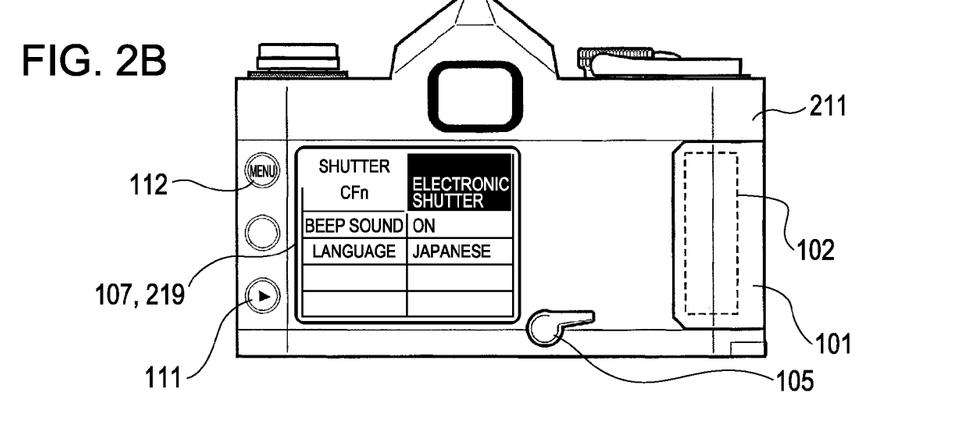
Figure 2C:
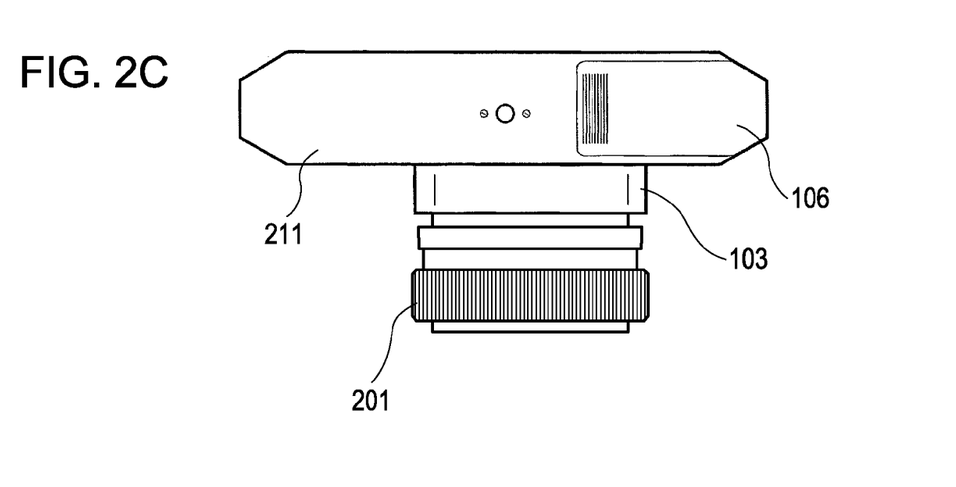

FIGS. 2A to 2C are external views of the image pickup apparatus having the structure described above.

The image pickup apparatus includes a compact flash (CF) card cover 101 designed to protect an external memory, or a CF card, having photographed digital images stored therein, and a CF card mounting unit or card slot 102 that appears when the CF card cover 101 opens. The image pickup apparatus further includes a lens mount 103 on which the interchangeable lens 201 is mounted when it is attached to the main body 211. The image pickup apparatus further includes a power lever 105 operable to power on or off the image pickup apparatus, a battery cover 106 that is openable and closable to insert or remove a battery, and a liquid crystal display 107 operable to display various types of setting information and images. The liquid crystal display 107 corresponds to the liquid crystal display 219 shown in FIG. 1.

The image pickup apparatus further includes a setting dial 108 operable to set a shutter speed, an aperture value, a shutter control method, etc., and a mode dial 110 operable to set an operating mode of the image pickup apparatus (e.g., a camera). The image pickup apparatus further includes an image playback button 111 operable to display a photographed image on the liquid crystal display 107, a menu display button 112 operable to display a setting screen on the liquid crystal display 107, a release button 113 operable to start a photographing operation, and a live-view start button 114.

A sequence of operations prior to live-view shooting will now be described.

First, the battery cover 106 is opened to place a charged buttery into the main body 211, and the battery cover 106 is closed. Then, the CF card cover 101 is opened to insert a CF card into the card slot 102, and the CF card cover 101 is closed. Then, the interchangeable lens 201 is mounted on the lens mount 103, and the power lever 105 is operated to power on the image pickup apparatus.

Then, the mode dial 110 is operated to set a live-view shooting mode. After the image pickup apparatus is directed to an object, the release button 113 is half-pressed. In response to the half-press operation, the main body microcomputer 222 controls the reflex mirror 214 to move up and the mechanical shutter to open, and causes a light beam coming from the interchangeable lens 201 to enter the image pickup element 213. Images formed on the image pickup element 213 are sequentially displayed on the liquid crystal display 107 in the live view. A user performs operations such as image composition and focusing while viewing the live-view images, and fully presses the release button 113. Thus, actual photographing is performed.

Which shutter of the electronic shutter and the mechanical shutter is used to perform exposure control during the actual photographing will be described in the context of automatic selection.

In the live-view shooting mode, the reflex mirror 214 flips up. Thus, a photographing operation is performed by using the electronic shutter. In a case where the live-view shooting mode has been set when the release button 113 is pressed, as described below, the automatic selector, which is provided in the main body microcomputer 222, selects the electronic shutter as a shutter to be used for exposure control. In FIG. 2B, the setting screen is displayed on the liquid crystal display 107 to allow manual selection of a shutter method. The image pickup apparatus is therefore capable of automatically selecting a shutter method using the automatic selector and manually selecting a shutter method by a user. The details of the manual selection of a shutter method during photographing are described below.

Figure 3:
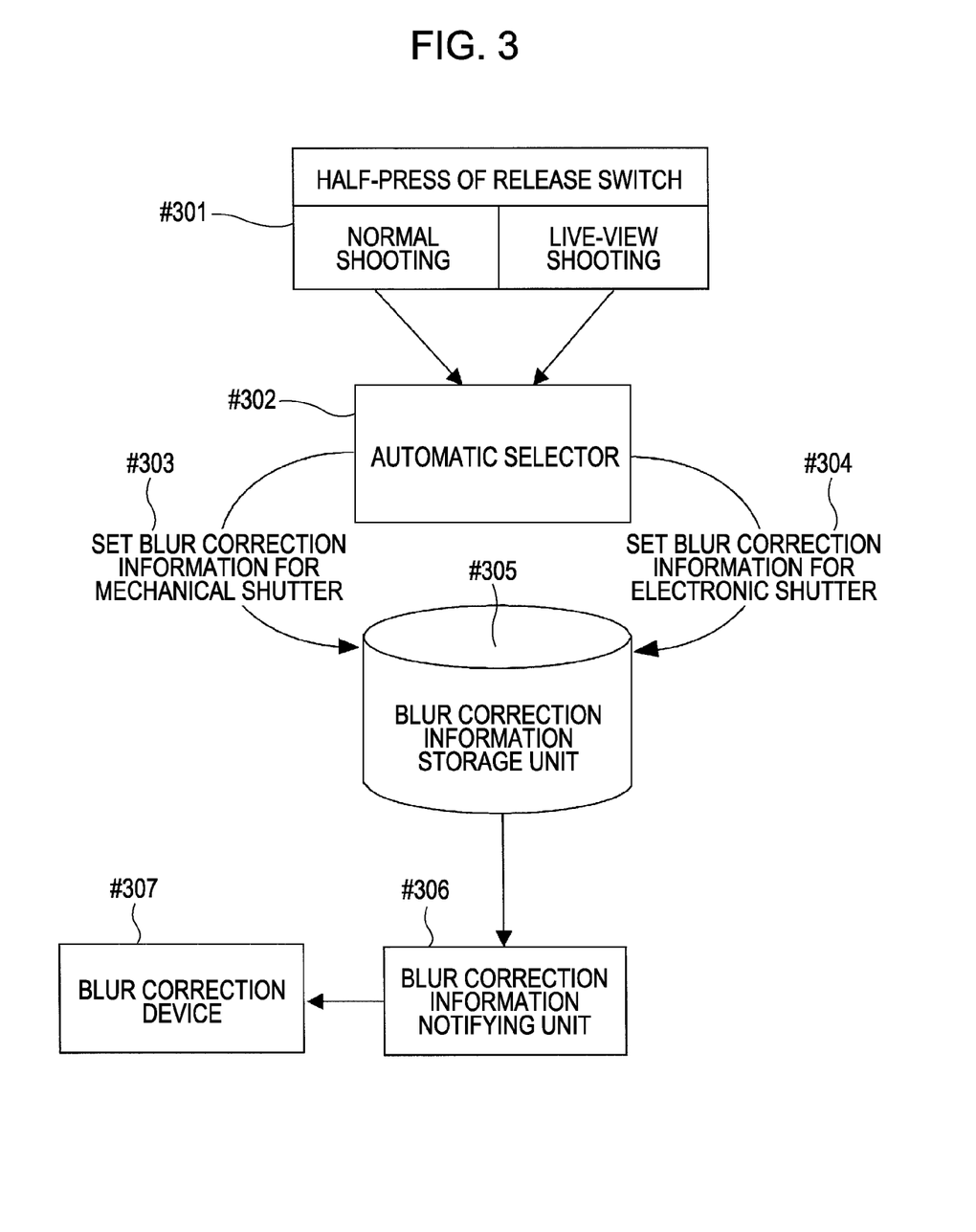
FIG. 3 is a conceptual diagram showing automatic selection of a shutter according to the exemplary embodiment of the present invention.

FIG. 3 is a conceptual diagram showing automatic selection of the electronic shutter or the mechanical shutter as a shutter.

When the release button 113 is half-pressed, camera status information, or more specifically, information indicating whether the current shooting mode is a "normal shooting mode" or a "live-view shooting mode", is generated (#301).

The camera status information is detected by the automatic selector provided in the main body 211. If the camera status information indicates the "normal shooting mode", the automatic selector selects the mechanical shutter as a shutter to be used for exposure control. Then, blur correction information associated with the mechanical shutter is stored in a blur correction information storage unit (steps #302, #303, and #305 are performed in this order). The stored blur correction information is blur correction information for correcting for image blur caused by vibration which may occur during operation of the mechanical shutter. The blur correction information may be stored in advance in the memory or may be determined by a calculation based on detected vibration.

If the camera status information indicates the "live-view shooting mode", the automatic selector stores blur correction information (second information), which is different from the blur correction information associated with the mechanical shutter (first information). That is, the automatic selector stores the blur correction information associated with the electronic shutter in the blur correction information storage unit (steps #302, #304, and #305 are performed in this order). The details of the blur correction information in this case are described below.

The blur correction information stored in the blur correction information storage unit is transmitted (or output) to a blur correction device (that is, the blur correction microcomputer 203) included in the interchangeable lens 201 through a blur correction information notifying unit (steps #306 and #307 are performed in this order).

Accordingly, blur correction information can be automatically set in association with a camera status during photographing.

Figure 4:
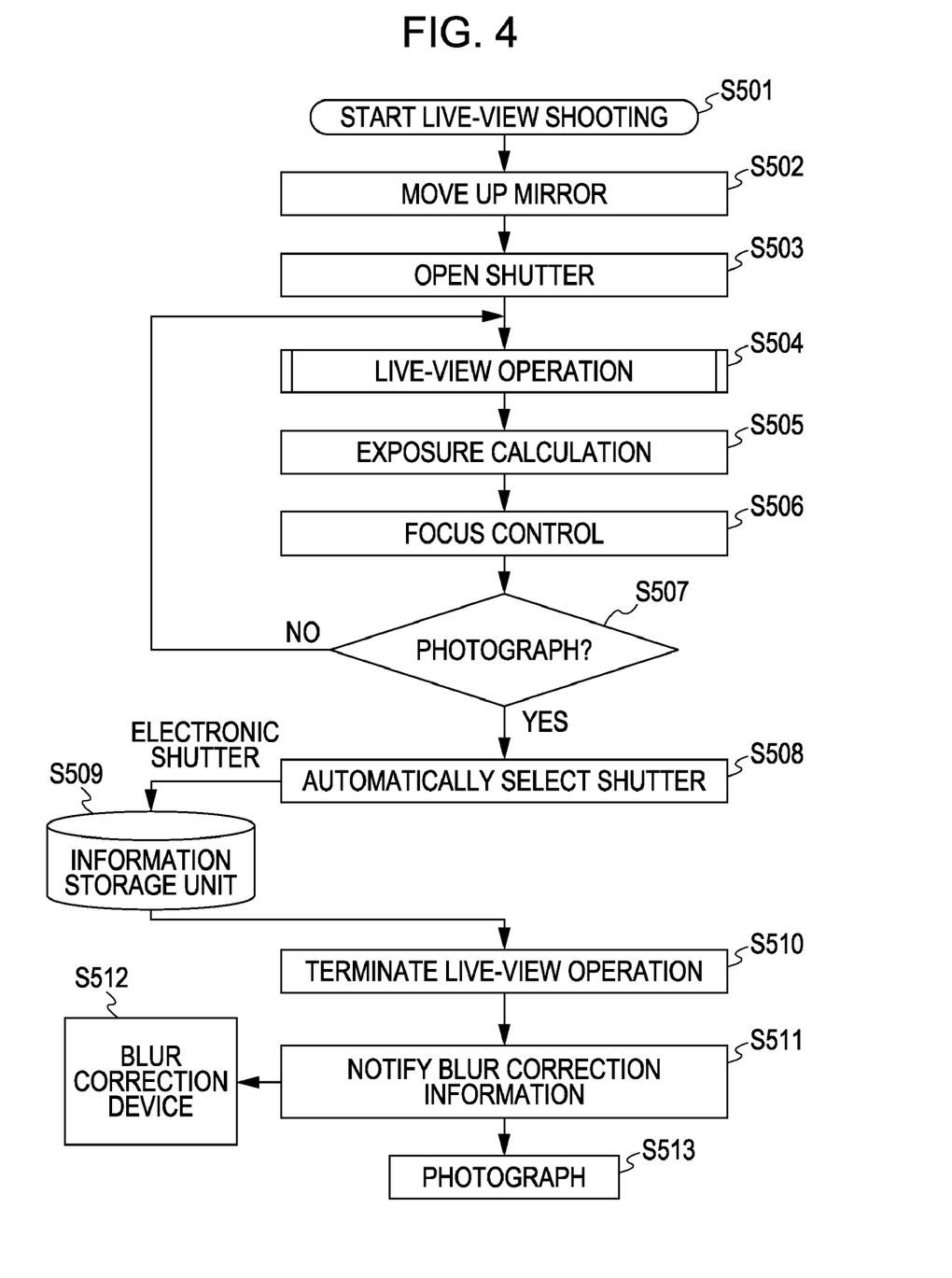
FIG. 4 is a flowchart showing a process for automatically selecting a shutter and performing processing for blur correction information according to the exemplary embodiment of the present invention.

A process for automatically selecting a shutter and outputting blur correction information to the blur correction device in a case where the live-view shooting mode is selected will be described with reference to a flowchart shown in FIG. 4. The process is performed by the main body microcomputer 222 including the automatic selector, blur correction information storage unit, and blur correction information notifying unit shown in FIG. 3.

In step S501, live-view shooting starts. In step S502, the reflex mirror 214 moves up (that is, the reflex mirror 214 is retracted from the photographing optical path). In step S503, the mechanical shutter is released (that is, the front curtain 217 is caused to run). This allows a photographing light beam to enter the image pickup element 213. In step S504, a live-view operation is performed in which an image formed on the image pickup element 213 is displayed on the liquid crystal display 107.

In step S505, exposure calculation is performed to appropriately adjust the exposure of the image displayed in the live view. In step S506, information necessary for focusing is obtained from an image obtained during the live-view shooting or the like, and focus control is performed. In step S507, it is determined whether or not a photographing operation has been instructed, that is, whether or not the release button 113 has been fully pressed. If the release button 113 has not been fully pressed (NO in step S507), the process returns to step S504, and operations similar to those described above are repeated.

If the release button 113 has fully been pressed and a photographing operation has been instructed (YES in step S507), the process proceeds from step S507 to step S508. In step S508, as described above, the automatic selector selects one of the electronic shutter and the mechanical shutter as a shutter to be used to start the photographing operation. In step S509, blur correction information associated with the selected shutter is stored in the blur correction information storage unit. In the live-view shooting mode, since the mechanical shutter is already released in step S503, the electronic shutter is selected in step S509. Since the electronic shutter is selected, a value equivalent to zero is stored as blur correction information in the blur correction information storage unit. Then, the process proceeds to step S510, and the live-view operation in which an image is being displayed on the liquid crystal display 107 prior to a photographing operation is terminated. Then, the process proceeds to step S511.

The blur correction information stored in this way is output to the blur correction device through the blur correction information notifying unit in steps S511 and S512.

The details of the blur correction information will now be described.

The blur correction information includes three pieces of information: (1) time information indicating at what time later than a certain time vibration will occur due to the operation of the shutter; (2) information indicating the degree of the vibration that will occur at the specified time: and (3) information indicating within what period of time the vibration will stop. In order to specify the "certain time", real-time communication is also performed.

The blur correction information is output prior to the start of exposure for recording so that blur correction based on the blur correction information can be synchronized with the exposure.

For example, in a case where the mechanical shutter is selected in the normal shooting mode, the mechanical shutter may be associated with blur correction information indicating "vibration occurs 2 ms later with a degree of 100 counts, which is counted by a sensor of the blur correction device, and the vibration continues for a period of about 1 ms". In this case, the following blur correction information is transmitted (or output) to the blur correction device:

blur correction information=2 ms: 100 counts: 1 ms

Then, the timing of starting the operation of the shutter is transmitted to the blur correction device. Thus, the blur correction control microcomputer 203 performs blur correction control using the transmitted blur correction information from the timing of starting the operation to effectively prevent vibration due to disturbance other than shaking caused by the user.

In a case where the electronic shutter is selected as a shutter, such disturbance as described above may not occur, and the following blur correction information is transmitted to the blur correction device:

blur correction information=2 ms: 0 counts: 1 ms In this case, blur correction is not required and no blur correction information may be transmitted. However, it is necessary to transmit some information because a system including an interchangeable lens and a main body of an image pickup apparatus is established by a rule in which transmitted blur correction information is used for blur correction control that starts in response to communication at a timing of starting the operation of the shutter. In this exemplary embodiment, therefore, blur correction information indicating that vibration with a degree of 0 counts is transmitted to the blur correction device. This allows the system to be established without changing the rule between the lens and the main body.

Alternatively, if such a rule does not exist between the lens and the main body or if a new rule is applicable even though an existing rule exists, no blur correction information may be transmitted.

In a case where the electronic shutter is selected, due to the absence of vibration, information parts expressed in the units of time may be set to 0 as follows:

blur correction information=0 ms: 0 counts: 0 ms

However, the electronic shutter is newly developed technology, and some interchangeable lenses equipped with a blur correction device may be incompatible with such electronic shutter technology. If such interchangeable lenses are operated with parameters expressed in the units of time being set to 0, control failure may occur. For example, a general microcomputer is provided with a timer device as a hardware device used for time processing. The timer device is designed to count a time period more than zero, and is used for latency control in which a certain operation starts after that time period. The timer device presumably counts a time period more than zero, and the ability to transmit "time=0 sec" to indicate no latency time depends on whether or not a control program for the timer device supports such usage. If the control program does not support the usage, setting the latency time to zero might cause unexpected results such as latency as long as the timer device can count.

In this exemplary embodiment, a desired effect is obtained by setting blur correction information to zero counts, and there is no problem in representing a characteristic of the electronic shutter in which no vibration occurs if two parameters expressed in the units of time are set to values other than zero. However, in view of system's backward compatibility with old products or in order to avoid unintended operation with the use of a combination of a camera and an interchangeable lens manufactured by unknown manufacturer different from that of the camera, the blur correction information described above (2 ms: 0 count: 1 ms) is transmitted. That is, blur correction information that does not enable the blur correction device (blur correction unit) is output to the blur correction device. In order to prevent overcorrection of the blur correction described above, furthermore, blur correction information may be maintained so that the amount of blur correction performed for the electronic shutter is reduced compared with the amount of blur correction performed for the mechanical shutter.

Referring back to FIG. 4, after the blur correction information described above is output to the blur correction device, the process proceeds to step S513, and a photographing operation is performed. The photographing operation is similar to an existing photographing operation, and will not be discussed herein in detail.

Figure 5:
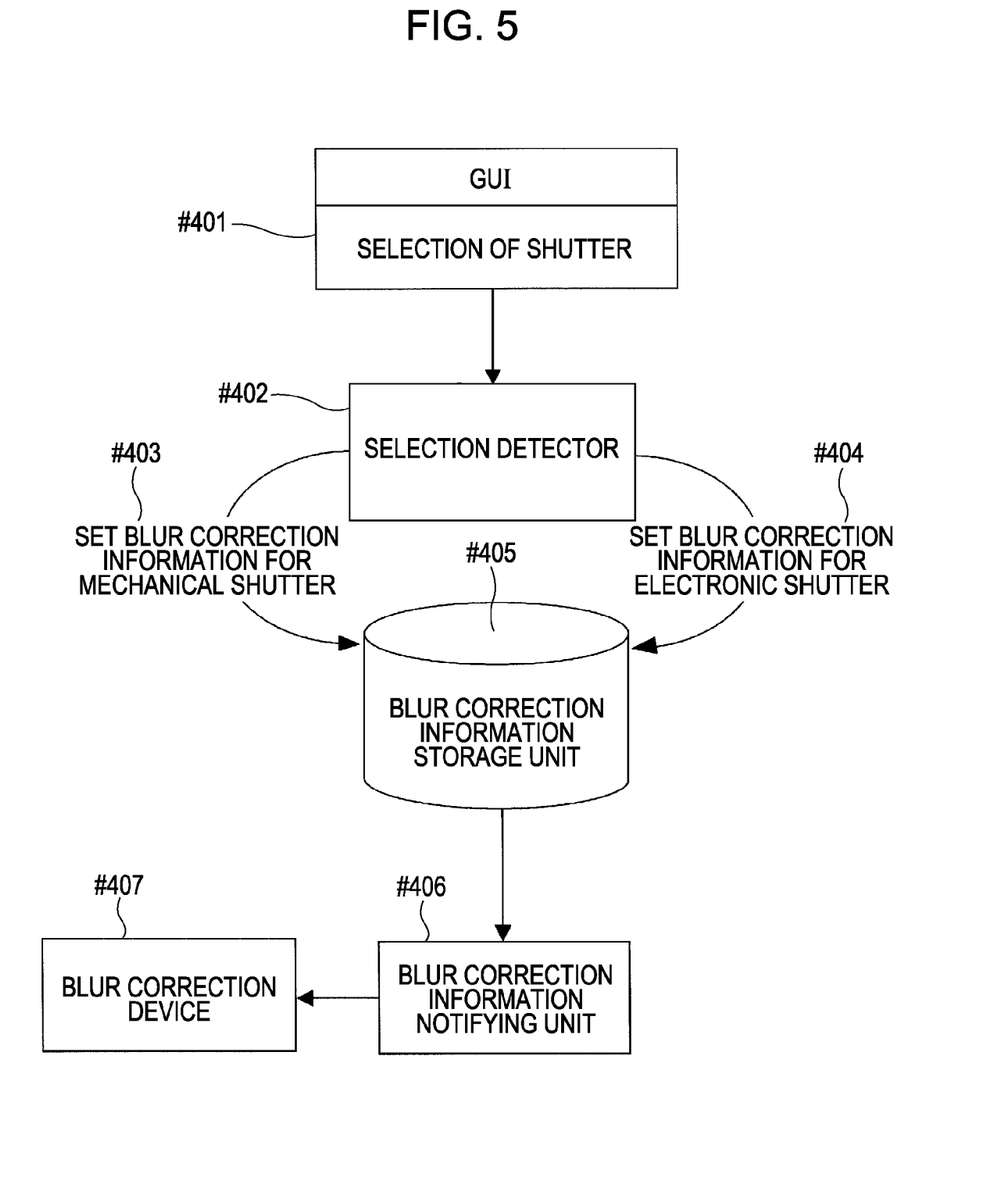
FIG. 5 is a conceptual diagram showing manual selection of a shutter according to the exemplary embodiment of the present invention.

FIG. 5 is a conceptual diagram showing manual selection of one of the electronic shutter or the mechanical shutter as a shutter.

As shown in FIG. 2, a setting screen is displayed on the liquid crystal display 107, and one of the shutters is selected through a graphical user interface (GUI) (#401). GUI is a user interface that allows a user to select an item by using a camera operation member (such as the menu display button 112 or the setting dial 108) (in case of a personal computer, by using a mouse) to change a setting value while viewing a menu displayed on the liquid crystal display 107 shown in FIG. 2. Which of the mechanical shutter and the electronic shutter has been selected as a shutter is detected by a selection detector provided in the main body microcomputer 222. If the "mechanical shutter" is selected as a shutter, the selection detector stores the above-described blur correction information associated with the mechanical shutter in the blur correction information storage unit (steps #402, #403, and #405 are performed in this order).

If the "electronic shutter" is selected as a shutter, the selection detector stores the above-described blur correction information associated with the electronic shutter in the blur correction information storage unit (steps #402, #404, and #405 are performed in this order).

The blur correction information stored in the blur correction information storage unit is transmitted (or output) to the blur correction device included in the interchangeable lens 201 through the blur correction information notifying unit (steps #406 and #407 are performed in this order).

Accordingly, blur correction information can be manually set according to a GUI setting prior to photographing.

Figure 6:
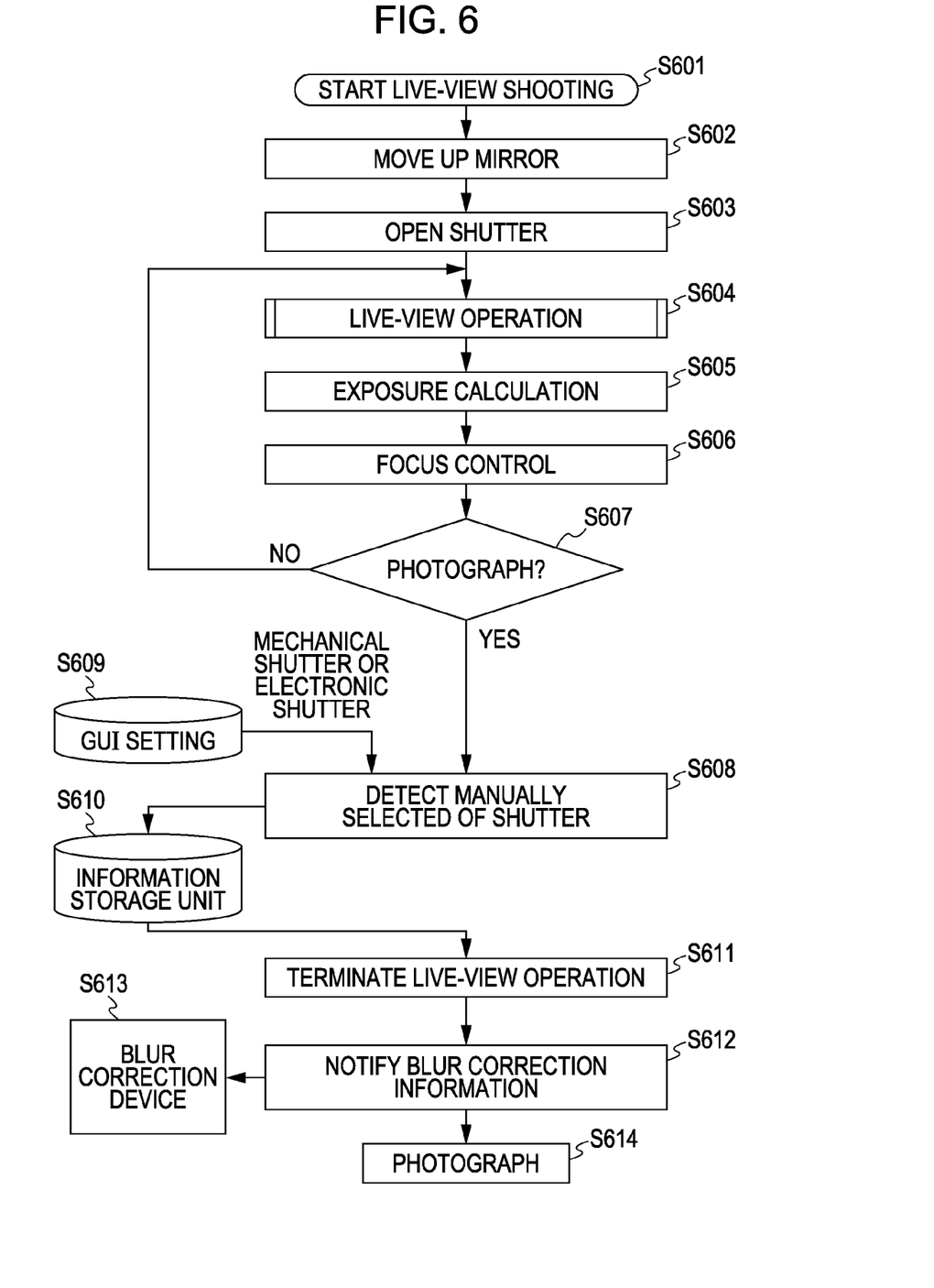
FIG. 6 is a flowchart showing a process for automatically selecting a shutter and performing processing for blur correction information according to the exemplary embodiment of the present invention.

A process for outputting blur correction information to the blur correction device in a case where the live-view shooting mode is selected and a shutter is manually selected will be described with reference to a flowchart shown in FIG. 6. The process is performed by the main body microcomputer 222 including the GUI, selection detector, blur correction information storage unit, and blur correction information notifying unit shown in FIG. 5.

In step S601, live-view shooting starts. In step S602, the reflex mirror 214 moves up. In step S603, the mechanical shutter is released (that is, the front curtain 217 is caused to run). This allows a photographing light beam to enter the image pickup element 213. In step S604, a live-view operation is performed in which an image formed on the image pickup element 213 is displayed on the liquid crystal display 107.

In step S605, exposure calculation is performed to appropriately adjust the exposure of the image displayed in the live view. In step S606, information necessary for focusing is obtained from an image obtained during the live-view shooting or the like, and focus control is performed. In step S607, it is determined whether or not a photographing operation has been instructed, that is, whether or not the release button 113 has been fully pressed. If the release button 113 has not been fully pressed (NO in step S607), the process returns to step S604, and operations similar to those described above are repeated.

If the release button 113 has been fully pressed and a photographing operation has been instructed (YES in step S607), the process proceeds from step S607 to step S608. In step S608, the selection detector detects whether the electronic shutter or the mechanical shutter has been manually selected as a shutter to be used to start the photographing operation on the basis of GUI settings of step S609. In step S610, blur correction information associated with the selected shutter (the mechanical shutter or the electronic shutter) is stored in the blur correction information storage unit. Then, the process proceeds to step S611, and the live-view operation in which an image is being displayed on the liquid crystal display 107 prior to a photographing operation is terminated. Then, the process proceeds to step S612. The processing performed for the stored blur correction information is similar to that in the automatic selection described above, and will not be discussed herein in detail.

The blur correction information stored in this way is output to the blur correction device through the blur correction information notifying unit in steps S612 and S613.

After the blur correction information described above is output to the blur correction device, the process proceeds to step S614, and a photographing operation is performed for recording an image. In this case, exposure control is performed using the manually selected shutter. If the electronic shutter is selected, a timing of starting the operation of the electronic shutter corresponding to the front curtain 217 is output.

Then, the image pickup element 213 is exposed to light for recording, and the rear curtain 218 of the mechanical shutter is closed after a predetermined period of time has elapsed. A signal for reading is read with the image pickup element 213 being light-shielded, and afterwards the front curtain 217 and the rear curtain 218 of the mechanical shutter are released. Then, as described in step S603, the front curtain 217 is caused to run to allow a photographing light beam to enter the image pickup element 213.

In this exemplary embodiment, the image pickup element 213, which is exposed to light for recording, is light-shielded by using the rear curtain 218 of the mechanical shutter after the recording is finished. Such a light shielding operation may be omitted in a case where the number of recording pixels is small or in a case where the image pickup element 213 can be driven at a high speed.

If the mechanical shutter is selected, since the mechanical shutter is already released in step 603, the rear curtain 218 of the mechanical shutter is further caused to run and a shutter charge operation is performed again. Further description is not necessary in the present invention and is omitted.

According to the foregoing exemplary embodiment, in a case where the electronic shutter is automatically or manually selected as a shutter, blur correction information that does not enable the blur correction device (information having blur correction equal to zero) is output to the blur correction device.

Since blur correction information associated with a shutter to be selected can be selectably output to the blur correction device, the image pickup apparatus can provide a blur-free image if either shutter is selected.

The correspondence between elements described in the appended claims and the foregoing exemplary embodiment will be described. The automatic selector shown in FIG. 3 or the GUI shown in FIG. 5 corresponds to a selection unit configured to select a mechanical shutter or an electronic shutter on the basis of shooting conditions or on the basis of a manual operation according to the present invention. The blur correction optical system 202 and the blur correction control microcomputer 203 correspond to a blur correction unit configured to correct for image blur. The main body microcomputer 222 corresponds to a controller configured to output first information or second information to the blur correction unit at a timing of starting operation of the selected mechanical or electronic shutter. The blur correction information associated with the mechanical shutter corresponds to the first information, and the blur correction information associated with the electronic shutter corresponds to the second information, the first information and the second information being different from each other.

The interchangeable lens 201 corresponds to a lens apparatus attachable to the image pickup apparatus according to the present invention, and the blur correction control microcomputer 203 corresponds to a receiving unit configured to receive a signal from the image pickup apparatus.

The present invention is not limited to an image pickup apparatus having an interchangeable lens attached thereto, and may be applied to an image pickup apparatus integrated with a lens.

In the present invention, the blur correction unit may not necessarily be implemented by the blur correction optical system 202. In an embodiment of the present invention, the blur correction unit may be implemented by an existing unit configured to perform blur correction by moving an image pickup element on a plane perpendicular to an optical axis.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Application No. 2007-140189 filed May 28, 2007, which is hereby incorporated by reference herein in its entirety.

What is claimed is:

1. An image pickup apparatus having removably attached thereto a lens apparatus including a blur correction unit to perform a blur correction, comprising:
    a selection unit mounted in the image pickup apparatus to select a mode from a plurality of modes including a first mode in which a mechanical shutter is used to start exposure for recording an image and a second mode in which an electronic shutter is used to start exposure; and
    a controller mounted in the image pickup apparatus to output information to the lens apparatus after the start of exposure for recording has been instructed, the information comprising first information when the first mode is selected, the information comprising second information when the second mode is selected, the second information different from the first information;
    wherein the blur correction corresponds to the information, wherein a blur correction corresponding to the first information is different from a blur correction corresponding to the second information.

2. The image pickup apparatus according to claim 1, wherein the blur correction for an image blur caused by the mechanical shutter is restricted when the second mode is selected.

3. The image pickup apparatus according to claim 1, wherein an amount of the blur correction when the second mode is selected is less than an amount of the blur correction when the first mode is selected.

4. The image pickup apparatus according to claim 1, wherein the selection unit selects one of the mechanical shutter and the electronic shutter according to a manual operation of a user.

5. The image pickup apparatus according to claim 1, further comprising a storage unit configured to retrievably store in advance the first information.

6. The image pickup apparatus according to claim 1, wherein the first information or the second information is output to the blur correction unit of the lens apparatus.

7. The image pickup apparatus according to claim 1, wherein the controller outputs the information to the blur correction unit when operation of the exposure for the recording of the image begins.

8. An image pickup apparatus having removably attached thereto a lens apparatus including a blur correction unit, comprising:
    a selection unit configured to select a mode from a plurality of modes including a first mode in which a mechanical shutter is used to start exposure for recording an image and a second mode in which an electronic shutter is used to start exposure; and
    a controller configured to control operation of the lens apparatus after the start of exposure for recording has been instructed,
    wherein the controller outputs information indicating the start of exposure to the lens apparatus to change a blur correction operation of the lens apparatus when the first mode is selected, and does not output information indicating the start of exposure to the lens apparatus when the second mode is selected.

9. A lens apparatus attachable to an image pickup apparatus including a selection unit configured to select a mode from a plurality of modes including a first mode in which a mechanical shutter is used to start exposure for recording an image and a second mode in which an electronic shutter is used to start exposure, comprising:
    a receiving unit configured to receive information indicating the start of exposure from the image pickup apparatus after the start of exposure for recording has been instructed, wherein the information indicating the start of exposure comprises first information when the first mode is selected and the information indicating the start of exposure comprises second information when the second mode is selected; and
    a correction control unit configured to correct for image blur,
    wherein when the receiving unit receives the first information, the image blur corrected for by the correction control unit includes image blur caused by the mechanical shutter, and when the receiving unit receives the second information, the image blur corrected for by the correction control unit does not include image blur caused by the mechanical shutter.

* * * * *